United States Patent [19]

Huffner et al.

[11] 4,220,479

[45] Sep. 2, 1980

[54] PHTHALOCYANINE PIGMENTS FOR COLORING PLASTICS

[75] Inventors: Stanley F. Huffner; Hugh M. Smith, both of Cincinnati, Ohio

[73] Assignee: Sun Chemical Corporation, New York, N.Y.

[21] Appl. No.: 967,127

[22] Filed: Dec. 7, 1978

[51] Int. Cl.$^2$ ............................................. C09B 47/04
[52] U.S. Cl. ........................... 106/288 Q; 106/308 Q; 106/309
[58] Field of Search ............... 106/288 Q, 309, 308 Q, 106/308 M

[56] References Cited

U.S. PATENT DOCUMENTS

| | | | |
|---|---|---|---|
| 3,017,414 | 1/1962 | Minnich et al. ...................... | 106/309 |
| 3,029,249 | 4/1962 | Geiger et al. ...................... | 106/288 Q |
| 3,081,189 | 3/1963 | Zwahlen ...................... | 106/288 Q |
| 3,360,497 | 12/1967 | Jones et al. ............................ | 222/182 |
| 3,586,247 | 6/1971 | Lyle ...................................... | 241/16 |
| 3,708,457 | 1/1973 | Needham et al. ................. | 260/42.45 |
| 3,755,244 | 8/1973 | Hart ................................... | 260/42.21 |
| 3,764,360 | 10/1973 | Langley ........................... | 106/288 Q |

*Primary Examiner*—Winston A. Douglas
*Assistant Examiner*—J. V. Howard
*Attorney, Agent, or Firm*—Cynthia Berlow

[57] ABSTRACT

Pigments that are suitable for coloring clear plastics are prepared by grinding together crude copper phthalocyanine and crude cobalt phthalocyanine in the presence of a conventional grinding aid and a conventional conditioning agent.

4 Claims, No Drawings

PHTHALOCYANINE PIGMENTS FOR COLORING PLASTICS

BACKGROUND OF THE INVENTION

This invention relates to pigments. More particularly it relates to a process for preparing phthalocyanine pigments suitable for coloring clear plastics.

In coloring plastics, it is essential that the pigment be well distributed throughout the plastic material. Further, it is essential when coloring clear plastics that the pigment be transparent and stable to the conditions of both the processing and the end-use applications, such as fastness to light and migration.

The use of phthalocyanine pigments for coloring such plastics is known. Polyolefins are colored, according to U.S. Pat. No. 3,360,497, by first preparing an aqueous dispersion of the pigment in the presence of a surfactant, transferring the dispersion to a solution of low molecular weight polyolefin, adding powdered high molecular weight polyolefin, removing the water and solvent, and drying. U.S. Pat. No. 3,586,247 teaches the use of pigment compositions comprising the pigment and a carrier, such as a wax, rosin, rosin ester, and the like. In U.S. Pat. No. 3,708,457, polyolefins are compounded with an inorganic pigment in addition to phthalocyanine. U.S. Pat. No. 3,755,244 discloses coloring polyolefins by milling the pigment with low molecular weight polyolefin in water to form an aqueous slurry, granulating the pigment dispersion in the slurry with a water-immiscible organic liquid and a surfactant, and recovering the granulated pigment dispersion.

SUMMARY OF THE INVENTION

It has now been found that pigments that are strong and clean and unusually transparent in clear plastics can be prepared directly by grinding crude cobalt phthalocyanine with conventional crude copper phthalocyanine. As used herein, the term "crude pigment" defines a colorant that has a much larger particle size than does its pigmentary grade; for example, the particle size of the crude grade of copper phthalocyanine is generally about 40 to 50 microns or higher, whereas the particle size of its pigmentary grade is generally about 0.1 to 1 micron.

DETAILED DESCRIPTION OF THE INVENTION

The pigment products of this invention are prepared by grinding together crude cobalt phthalocyanine and crude copper phthalocyanine in the presence of a grinding aid and a conditioning agent, these components being known as the magma. The magma is then ground for about 6 to 24, and preferably about 10 to 18, hours, and the pigment product is recovered by any convenient method, e.g., by washing, drying, and pulverizing.

The temperature during grinding is not critical and can vary over a wide range. In general it is between about 25 and 125, and preferably between about 70 and 90° C.

The grinding of the magma may take place in any suitable intensive mixing device, such as a double-arm sigma blade mixer, a ball mill, a vibratory mill, an extruder, or the like.

The amount of crude copper phthalocyanine is generally about 380 to 450, and preferably about 400 to 420, parts by weight, and the amount of crude cobalt phthalocyanine is generally about 15 to 150, and preferably about 30 to 100, parts by weight, based on the magma. The ratio of the amounts of crude copper phthalocyanine:crude cobalt phthalocyanine is generally about 25 to 30:1 to 10, and preferably about 13 to 14:1 to 3.

Any suitable and convenient grinding aid may be used, such as an alkali metal halide, carbonate, sulfate, or phosphate, e.g., sodium and potassium chloride, carbonate, sulfate, acid sulfate, phosphate, or acid phosphate; aluminum sulfate; calcium oxide; sugar; urea; and the like; and mixtures thereof, usually in finely divided form. It is used in an amount ranging from 3000 to 6000, and preferably between about 4200 to 4800, parts by weight, based on the magma.

The conditioning agent may be any suitable conventional one, such as for example a polyol, a polyol ester or ether, a chlorinated derivative of a polyol, and the like, and their mixtures. It is used in an amount ranging from about 600 to 1000, and preferably about 800 to 950, parts by weight, based on the magma.

It is also within the scope of this invention to treat the pigment product with an emulsion coating, such as one produced by mixing textile spirits with water and an anionic surfactant in order to render the final product into a form that is readily dispersible in the end-use application.

The pigment products of this invention are exceptionally strong, clean, transparent, red-shade blue phthalocyanine pigments that are particularly suited for use in clear plastics, such as polyolefins, e.g., polyethylene, polypropylene, and their mixtures and copolymers; vinyl chloride polymers; polystyrenes; cellulose acetate butyrate and the like, that are used in, for example, films, sheets, and tubing.

The pigments are readily dispersible in the plastics and have good heat and light stability.

Because of their excellent strength, transparency, stability, and dispersibility, these pigments are also useful in metallic automotive coatings.

The amount of the phthalocyanine pigment required to color the plastic is generally about 0.01 to 2 percent, based on the weight of the plastic. It may be incorporated into the plastic in any convenient manner, such as dry blending the pigment and plastic, blending the dry pigment with molten plastic, or the like.

The invention is further illustrated by the following examples wherein all parts are by weight, unless otherwise specified.

EXAMPLE 1

(A) 405 Parts of crude copper phthalocyanine, 45 parts of crude cobalt phthalocyanine, 4500 parts of micropulverized sodium chloride, and 900 parts of diethylene glycol were charged into a Baker-Perkins double-arm mixer equipped with sigma blades and mixed for 10 hours at 80° C., until pigmentation was complete. The product was recovered by washing with water to remove the salt, filtering, and drying.

(B) To determine the dispersiblity of the pigment in polyvinyl chloride, 1.0 part of the product (A) was dispersed in 400 parts of polyvinyl chloride on a 3"×8" two-roll mill set at 260°-270° F. with a 20-mil gap between the rolls for a period of 9 minutes.

(C) To determine the dispersibility of the pigment in polyethylene, 1.0 part of the product (A) was dispersed in 1000 parts of a low density polyethylene by the procedure of part (B) above.

(D) The procedures of parts (A), (B), and (C) were repeated except that 450 parts of crude copper phthalocyanine was used instead of 405 parts of copper phthalocyanine and 45 parts of cobalt phthalocyanine.

The product (A) was an exceptionally strong, clean, and transparent red-shade blue in clear plastics when compared to product (D).

(E) The procedures of parts (A), (B), and (C) were repeated except that 450 parts of crude cobalt phthalocyanine was used instead of 405 parts of copper phthalocyanine and 45 parts of cobalt phthalocyanine. The product (E) was noticeably green, dull, and opaque when compared to product (A).

(F) The procedures of parts (A), (B), and (C) were repeated except that 450 parts of monochloro copper phthalocyanine was used instead of 405 parts of copper phthalocyanine and 45 parts of cobalt phthalocyanine. The product (A) was exceptionally strong, red, clean, and transparent when compared to product (F).

EXAMPLE 2

The procedures of Examples 1 (A), (B), and (C) were repeated with the ratios of the amount of the crude copper phthalocyanine:crude cobalt phthalocyanine varying as follows: 6:1, 8.5:1, and 12:1. The results were comparable.

EXAMPLE 3

The product of Example 1 (A) was dispersed in a ball mill into a thermosetting acrylic resin system. The resulting pigmented acrylic coating had good transparency, depth, gloss, and durability and was suitable for use as a metallic automotive coating.

What is claimed is:

1. A phthalocyanine pigment for coloring clear plastics which consists of the product of the co-attrition of crude copper phthalocyanine and crude cobalt phthalocyanine wherein the amount of crude copper phthalocyanine is about 380 to 450 parts and the amount of crude cobalt phthalocyanine is about 15 to 150 parts.

2. The pigment of claim 1 wherein the amount of copper phthalocyanine is about 400 to 420 parts and the amount of cobalt phthalocyanine is about 30 to 100 parts.

3. A phthalocyanine pigment for coloring metallic automotive coatings which consists of the product of the co-attrition of crude copper phthalocyanine and crude cobalt phthalocyanine wherein the amount of crude phthalocyanine is about 380 to 450 parts and the amount of crude cobalt phthalocyanine is about 15 to 150 parts.

4. The pigment of claim 3 wherein the amount of copper phthalocyanine is about 400 to 420 parts and the amount of cobalt phthalocyanine is about 30 to 100 parts.

* * * * *